United States Patent
Thompson (10) Patent No.: US 10,216,563 B2
(45) Date of Patent: Feb. 26, 2019

(54) SAFETY FILTER IN A VEHICLE NETWORK

(71) Applicant: TRW Limited, Solihull West Midlands (GB)

(72) Inventor: Martin John Thompson, Solihull (GB)

(73) Assignee: TRW Limited, Solihull, West Midlands (GB)

(*) Notice: Subject to any disclaimer, the term of this patent is extended or adjusted under 35 U.S.C. 154(b) by 0 days.

(21) Appl. No.: 14/917,210

(22) PCT Filed: Sep. 3, 2014

(86) PCT No.: PCT/GB2014/052660
§ 371 (c)(1),
(2) Date: Mar. 7, 2016

(87) PCT Pub. No.: WO2015/033131
PCT Pub. Date: Mar. 12, 2015

(65) Prior Publication Data
US 2016/0196176 A1    Jul. 7, 2016

(30) Foreign Application Priority Data

Sep. 5, 2013  (GB) .................................. 1315826.6

(51) Int. Cl.
G06F 11/07      (2006.01)
H04L 12/24      (2006.01)
H04L 12/40      (2006.01)

(52) U.S. Cl.
CPC ........ G06F 11/0781 (2013.01); G06F 11/076 (2013.01); G06F 11/079 (2013.01);
(Continued)

(58) Field of Classification Search
CPC ............ G06F 11/0709; G06F 11/0784; G06F 11/0781; G06F 11/0796; G06F 11/30;
(Continued)

(56) References Cited

U.S. PATENT DOCUMENTS 4,321,666 A * 3/1982 Tasar ...................... G06F 11/00
714/10
5,784,547 A   7/1998 Dittmar et al.
7,120,559 B1* 10/2006 Williams .............. G06F 11/079
702/185

(Continued)

FOREIGN PATENT DOCUMENTS

CN   101417636 A   4/2009
CN   101557328 A   10/2009
CN   102195840 A   9/2011

OTHER PUBLICATIONS

Patents Act 1977: Search Report under Section 17(5), Application No. GB1315826.6, dated Apr. 11, 2014.
(Continued)

Primary Examiner — Joseph O Schell
(74) Attorney, Agent, or Firm — MacMillan, Sobanski & Todd, LLC (57) ABSTRACT

An electrical subsystem for a vehicle comprises an electronic control module adapted to generate one or more output messages suitable for transmission by a communication network, for instance a communication network, such as a CAN-bus, the subsystem further comprising:

a message filter which is arranged in the event of a fault of the electronic control module to filter the messages generated by the electronic control module so that only messages that meet predefined criteria are transmitted by the communication network and to block messages that do not meet that criteria.

12 Claims, 5 Drawing Sheets

(52) U.S. Cl.
CPC ...... *G06F 11/0739* (2013.01); *G06F 11/0772* (2013.01); *G06F 11/0796* (2013.01); *H04L 12/40032* (2013.01); *H04L 41/0604* (2013.01); *G06F 11/0709* (2013.01); *H04L 2012/40215* (2013.01); *H04L 2012/40273* (2013.01)

(58) Field of Classification Search
CPC ...... Y04S 20/222; Y04S 20/224; H04L 67/12; H04L 67/125; H04L 2012/40215; H04L 2012/40273; H04L 41/0604
See application file for complete search history.

(56) References Cited

U.S. PATENT DOCUMENTS

| | | | | |
|---|---|---|---|---|
| 8,504,820 | B2* | 8/2013 | Lu | H04L 63/123 |
| | | | | 713/151 |
| 2004/0078724 | A1* | 4/2004 | Keller | G06F 17/5081 |
| | | | | 714/48 |
| 2009/0248753 | A1* | 10/2009 | Tsai | G06F 11/0709 |
| 2012/0243426 | A1 | 9/2012 | Matsui et al. | |
| 2013/0070782 | A1* | 3/2013 | Vermeulen | H04L 12/40026 |
| | | | | 370/458 |
| 2014/0304553 | A1* | 10/2014 | Gondi | G06F 11/0751 |
| | | | | 714/39 |
| 2014/0379895 | A1* | 12/2014 | Jain | H04L 41/0654 |
| | | | | 709/224 |

OTHER PUBLICATIONS

PCT International Search Report and Written Opinion, Application No. PCT/GB2014/052660, dated Jan. 30, 2015.

\* cited by examiner

SAFETY FILTER IN A VEHICLE NETWORK

CROSS-REFERENCE TO RELATED APPLICATIONS

This application is the National Phase of International Application PCT/GB2014/052660 filed Sep. 3, 2014 which designated the U.S. and that International Application was published on Mar. 12, 2015 as International Publication Number WO 2015/033131 A1. PCT/GB2014/052660 claims priority to U.K. Patent Application No. 1315826.6, filed Sep. 5, 2013. The disclosures of both applications are incorporated herein by reference.

BACKGROUND OF THE INVENTION

This invention relates to improvements in electrical subsystems for vehicle, and to vehicles fitted with an improved electrical subsystem.

In a modern vehicle such as a passenger car or truck, there are many microcontrollers, each of the microcontrollers may control the operation of one or more electrical actuators located at various positions around the vehicle such as an electric motor or pump. They may also, or alternatively, receive signals from one or more sensors located at various locations around the vehicle such as steering angle sensors, motor position sensors, wheel speed sensors and so on. They may also receive input signals from devices such as cameras or radar systems, and output control signals for those devices. It is not unusual for several Electronic Control Units (ECUs) to share information amongst themselves in order to provide the required function of the vehicle. The vehicle speed may be used, for example, by the engine ECU and also the steering ECU.

Figure 5:
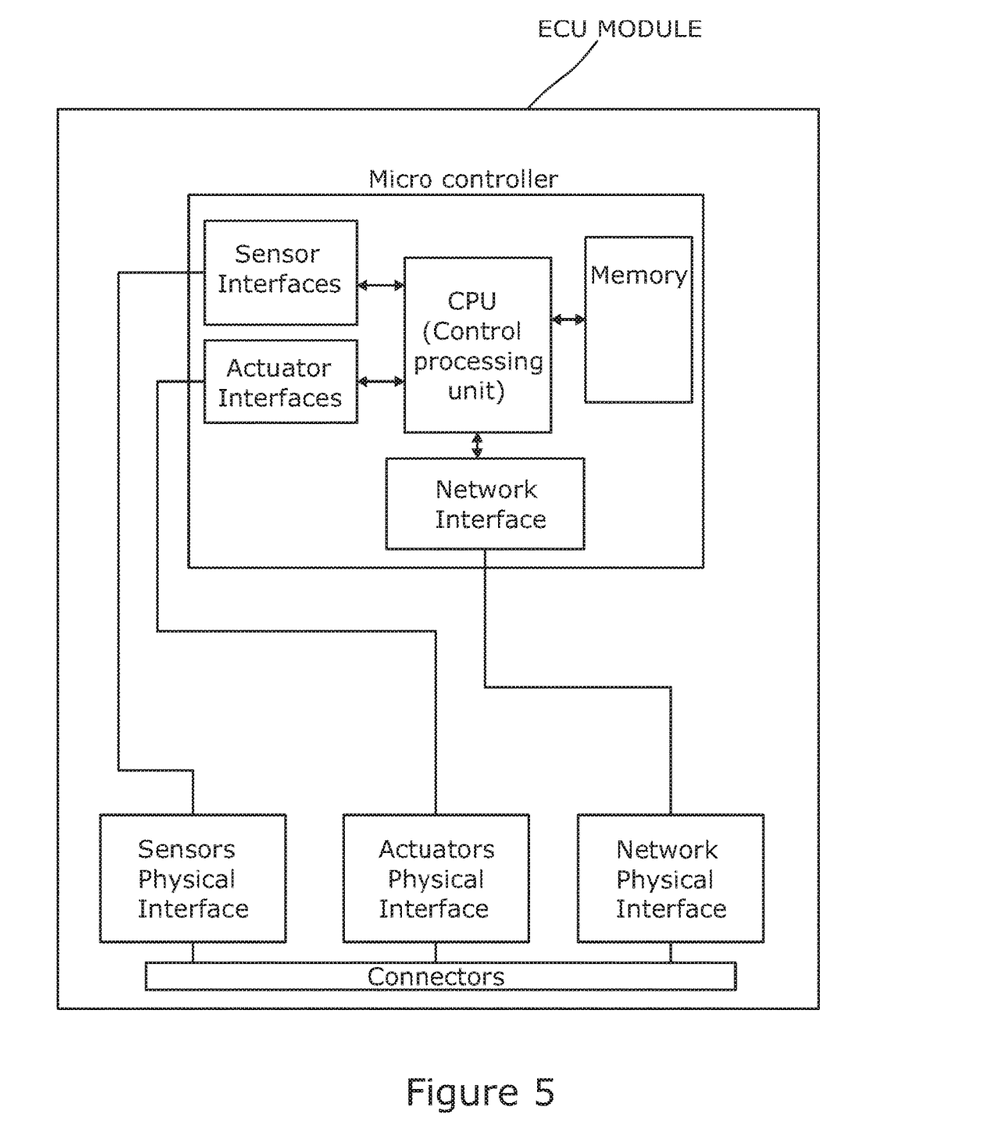
FIG. 5 shows a typical prior art control module.

The ECU is typically grouped together with memory and input ports for receiving signals from sensors and sending signals to actuators in the form of a microcontroller. The microcontroller is then grouped together with physical connectors for connection to actuators and sensors, and the components are then sealed within a housing. The various parts within the housing form an electronic control module. This is shown in FIG. 5 of the drawings.

To allow the various modules to send and receive signals to and from these sensors, actuators and other devices as well as to other ECUs, it is known to fit the vehicle with a communication network, most commonly one of the standards known as a communication bus. The bus comprises a bundle of electrical wires, or sometimes optical fibres, which can carry the various items of information around the vehicle. The bus is a local communications network that allows the microcontrollers and sensors etc to talk to each other. Each module should include at least one bus controller, typically within the housing, that allows the module to transmit and receive signals across the bus.

At the time of writing the most common electrical bus in road-vehicles is the Controller Area Network (CAN)-bus, which is a serial communication protocol bus. In a typical bus, messages are transmitted around the system that are coded with an identifier which is used to denote how a receiver should decode the data being transmitted (into physical parameters for example). Each module only acts upon messages with identifiers for data in which it has an interest. The protocol controls how the signals are transmitted, both in terms of coding and timing and how to deal with possible collisions when multiple modules are trying to send messages at the same time. Other bus protocols are also available—and for any given bus protocol there will be a set of rules defining how the bus controller interfaces with the bus.

In the event of a fault of a microcontroller it is important to ensure that incorrect signals cannot be sent across the network bus. If that were allowed to happen, the safety of the vehicle may be compromised.

In the prior art it is known to shut down the microcontroller of the control module when a fault is detected. The detection of a fault is typically performed by a fault detection unit which may be part of the microcontroller, or may be external, but within the ECU. When a fault is detected by the fault detection module it instructs the microcontroller or network interface to switch off, ensuring the network controller cannot send faulty signals across the network bus.

SUMMARY OF THE INVENTION

This invention should not be construed as being limited to the CAN-bus protocol. It may be construed as covering any other form of communication network that connects together multiple electronic devices in a vehicle using any known communication standard, and may include the Ethernet networking standard or any of the other emerging local area network technologies. It may even be extended to cover buses and networks in which some of the communication between devices on the vehicle occurs wirelessly.

The term "bus" is used in a broad sense in this application to cover such a variety of different automotive local area communication networks.

The bus can be used to interconnect all modules and devices. In other arrangements, some devices may input signals directly to the control module without the need for a bus. For example, in a safety domain control module data received directly from multiple sources such as camera and radar are fused directly. This removes the need for those sources to have their own network interface devices.

Within this specification, the term "electrical subsystem" is used to refer to at least one microcontroller and a network interface device which enable the module to supply message to a network bus.

Figure 1:
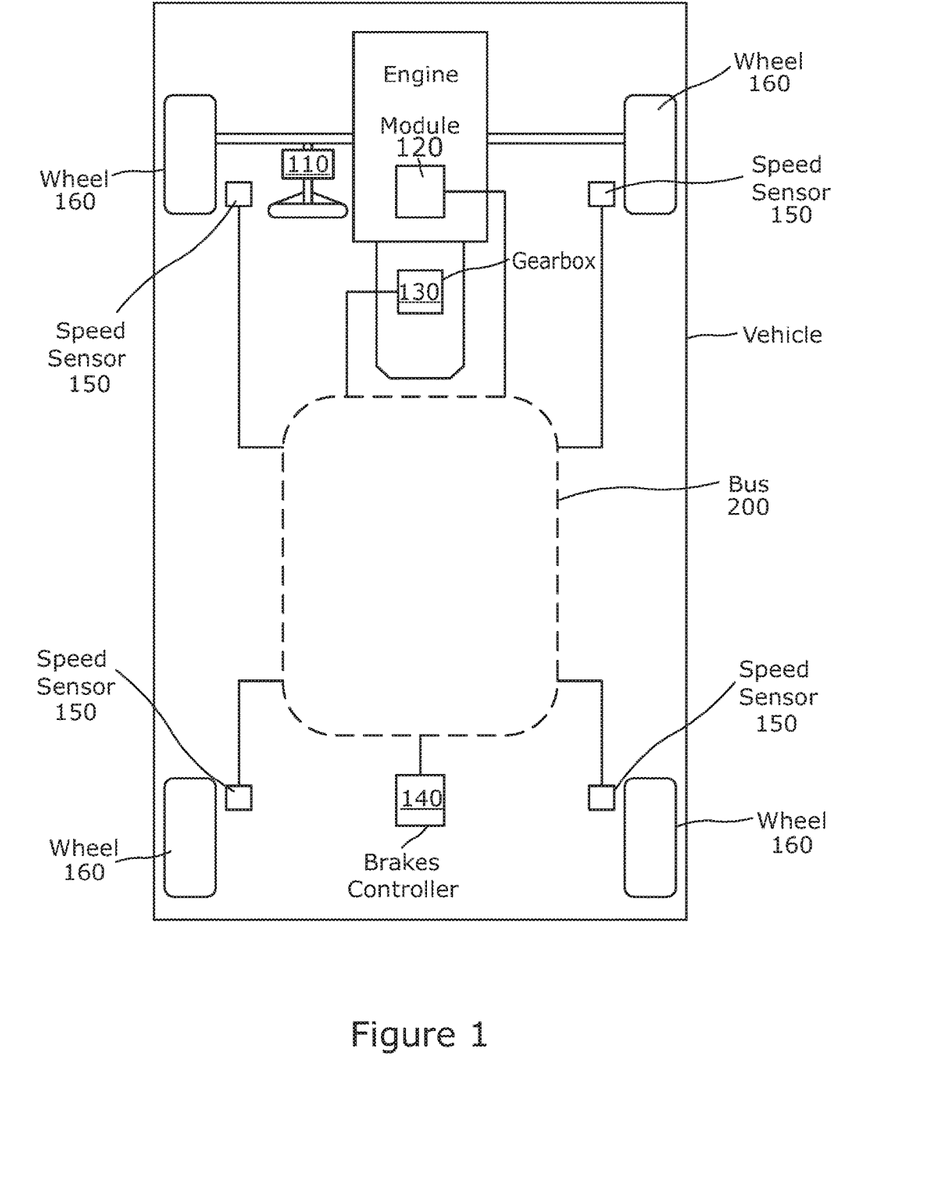
FIG. 1 is a schematic of a vehicle electrical network.

The relationship between a generic control module, a bus and an electrical device is shown in FIG. 1.

According to a first aspect the invention provides an electrical subsystem for a vehicle comprising an electronic control module adapted to generate one or more output messages suitable for transmission by a communication network, for example a CAN bus, the subsystem further comprising:

A message filter which is arranged in the event of a fault of the electronic control module to filter the messages generated by the electronic control module so that only messages that meet predefined criteria are transmitted by the communication bus and to block messages that do not meet that criteria.

The message filter may be arranged to only transmit messages which meet a criteria of being non-safety-critical for the vehicle. These criteria may be predetermined by storing in a memory associated with the filter a list of message types that are deemed safety critical, or a list of message types that are deemed not to be safety critical.

For example, each message may be tagged by the control module with a tag indicating the type of message. The filter may lookup in the memory the information to determine if the type of message is safe or not safe to transmit. For instance, it may reference a lookup table or list of message identifiers which are considered ok to transmit, and to block any others. Another option may be to look at a range of message identifiers, where they are numerical, which would require less memory compared with a complete list of message identifiers.

The filter may be arranged to receive an input signal from a diagnostic system, the input signal indicating whether the electronic control module is faulty or not faulty. The diagnostic system may comprise a part of the electronic control module.

The filter may intercept the messages output by the electronic control module,

Either blocking them or transmitting them to the bus depending on whether the module is working correctly or is faulty.

The filter may be part of the microcontroller, and may reside between the control module message output and a network interface device that is arranged to pass the messages to the communication bus. Or it could reside between the network interface and the network physical layer.

Alternatively the filter may be part of the network interface device.

Alternatively, there may be a one to one relationship between an electronic control module and a filter. For instance, in an Ethernet application each MAC address may be allocated a filter, with an MAC address being assigned to a specific electronic control module.

The electronic control module may be adapted to receive input signals from one or more devices associated with the vehicle, and produce messages dependent upon the value of the input signals. The sensors may comprise video cameras, radar apparatus, ultrasonic sensors etc. The module may receive input signals from more than one device. Where it receives information from more than one device, the electronic control module may form a Safety Domain electronic control unit (SDECU).

According to a second aspect the invention provides a message filter for use in a vehicle electrical subsystem of the kind that includes an electronic control module that in use generates messages of a number of different types that are to be transmitted across a network communication bus of the vehicle, in which the message filter comprises:

an input for receiving messages from the module prior to the messages being fed to the bus and an output at which the received messages can be fed onto the bus, the filter being configured so that in the event of a fault in the electronic control module the filter only passes through a subset of the total types of message from the module to the bus which meet a predefined criteria whilst allowing all message to pass to the bus when there is no fault.

The filter may be arranged to receive a signal from a fault detection unit indicative of whether the module has a fault.

The filter may include a memory which stores information indicating which types of message are safe to pass when there is a fault and which types are not safe to pass to the bus. This may store the information as a list of message types in a table along with an indicator that they are safe to pass or not safe to pass.

According to a third aspect the invention provides a method of operating an electrical subsystem of a vehicle of the kind comprising a network communication bus for carrying messages around the vehicle and at least one electronic control module which generates a number of different types of message for transmission by the bus, the method comprising:

In the event that the electronic control module is faulty filtering the messages so that only a subset of the types of message which are considered to be safe are transmitted across the bus.

The method may determine whether the type of message is safe using information stored in a memory.

The method may further comprise interrogating the faulty module to determine the nature of the fault and monitoring the messages relevant to the interrogation that are allowed to pass by the filter.

Therefore the method may comprise filtering the module that is faulty but not switching off the module when there is a fault.

Examples of message types that would not be considered safe include requests for engine, steering or braking actuation. Examples of message types that would be considered safe include diagnostics messages (for example the widely used CAN calibration protocol (CCP)), status messages.

Various aspects of this invention will become apparent to those skilled in the art from the following detailed description of the preferred embodiments, when read in light of the accompanying drawings.

DETAILED DESCRIPTION OF THE PREFERRED EMBODIMENTS

As shown in FIG. 1, a basic electrical network for a vehicle 100, such as a passenger car, comprises a set of electronic control modules 110,120,130, each of which is associated with a part of the vehicle. For example one module 110 may be associated with the steering, one module 120 with the engine, one module 130 with the gearbox, one module 140 with the brakes and so on. In a complex vehicle, there may be multiple electronic control modules associated with one part, for instance a complex engine may be controlled by two or more control modules.

The modules 110,120,130,140 are the "brains" of the vehicle, and receive input signals from various sensors on the vehicle. These sensors may include cameras, radar device, ultrasonic sensors, and magnetic effect sensors and so on. These sense parameters such as the speed of the vehicle, the rate of turning the steering wheel, the vehicle yaw rate, road wheel speed etc. FIG. 1 shows a set of four wheel speed sensors 150 which supply signals to all the modules. Each wheel speed sensor senses the speed of an associated wheel 160.

In practice, multiple modules may require information from the same sensor, and the modules may also need to receive or send signals to other modules. The gearbox module may perhaps want information about engine speed to help timing of a gear change. To allow the modules and sensors to share information they are connected to a vehicle network bus 200. Many types of bus are known, and perhaps the best known protocol is the CAN bus, which is widely used at the time of writing. This comprises a network of electrical wires along which messages can be sent between modules. The CAN protocol defines the form and timing of the messages. Other bus protocols can be used within the scope of this invention, An example of such a bus is the Flexray protocol. Other physical implementations of these buses are also used (for example, using optical methods rather than electrical)—these can also be used within the scope of this invention.

To transmit messages onto the bus 200, each module includes a network interface device. This converts signals from an microprocessor within the module into messages suitable for transmission across the network. Each message contains information about the signal, e.g. wheel speed, but is also tagged with a message type. The tag indicates the content of the message (for example a "wheel-speed message", or a "radar target message")

Figure 2:
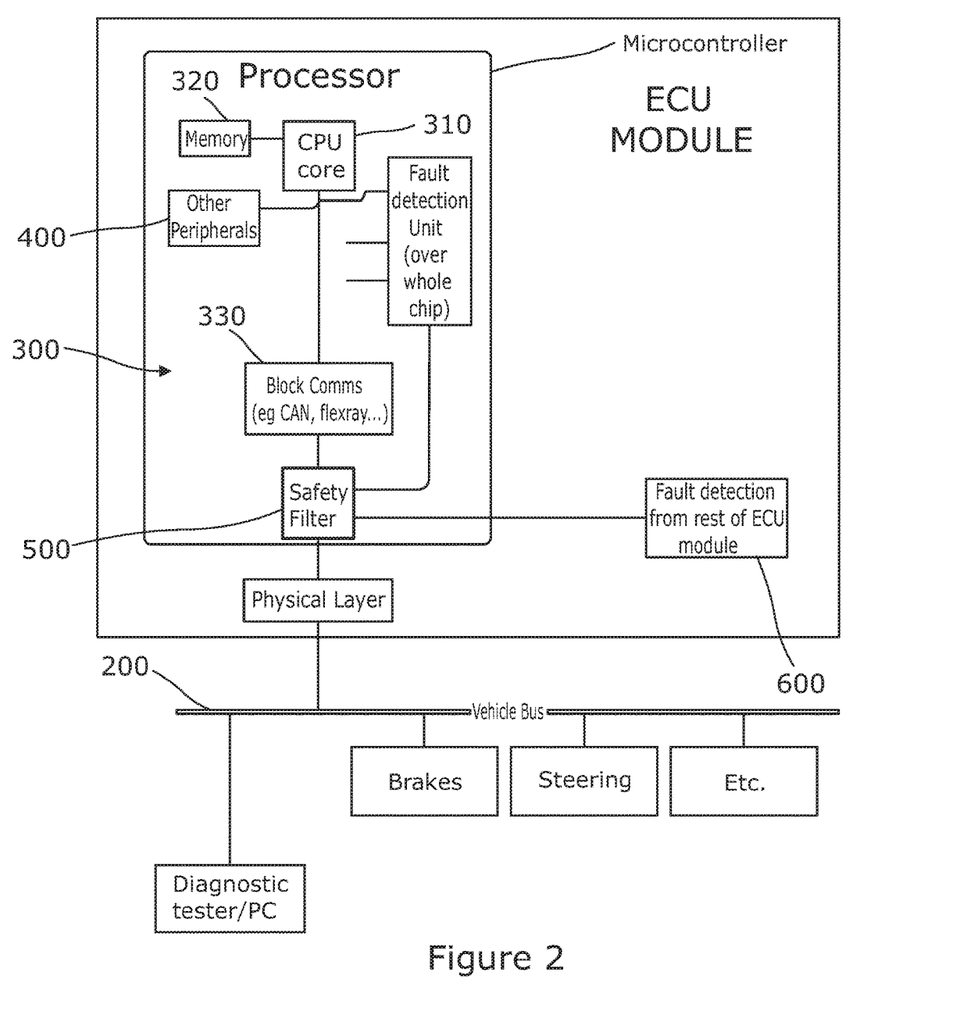
FIG. 2 is a schematic of an electrical subsystem that forms a part of the electrical network of the vehicle of FIG. 1.

FIG. 2 shows an electrical subsystem of the network which falls within the scope of an aspect of the present invention. The subsystem comprises an electronic control module 300 having a microprocessor (CPU core) 310, a memory 320 in which program instructions for the microprocessor 310 are stored, and a network interface device (CAN bus, flex ray or the like) 330. The microprocessor 310 outputs signals that are converted into message by the network interface device according to the protocol of the network bus that is used. The signals typically comprise instructions for actuators fitted to the vehicle, for example a signal telling a brake actuator how much pressure to apply, but may also include signals that can be used by other modules or devices such as signal indicating vehicle dynamics (pitch/roll/yaw), or thermal information about the module, in addition to lower-criticality diagnostic information about the health (or otherwise) of a particular module. The module 300 receives signals from a sensor 400, such as a camera or the wheel speed sensors 150, and the messages that it sends may depend of the information that is received from the sensor(s).

Some of the messages produced by the module 300 may be safety critical. In this example, the module 300 may output a demand to the steering system to turn by a certain amount. The module also outputs some messages that are not safety critical, for example diagnostic flags, information on light-levels. The sensor may be directly connected to module so that information is passed without transmission across the network. Alternatively the module may receive signals from the sensor in the form of messages that are sent across the network bus.

The subsystem also includes a safety filter 500. In this example it forms an integral part of the electronic control module and sits between the network interface device 330 and the bus 200, receiving messages form the network device 330 at an input and outputting the messages at an output onto the bus. The messages must pass through this filter to get to the bus. The filter 500 receives an input signal from a fault detection unit 600. The fault detection unit 600 identifies faults in the electronic control module. The fault detection unit 600 may combine a number of well-known techniques, for example, watchdogs, lockstep processor cores, challenge-response communications with the microprocessors. The micro-controller(s) may also have their own internal fault detection strategies which will also feed into the fault detection unit. In normal use, the messages all pass straight through the filter 500 to the bus, without modification and without significant delay. When the filter 500 receives an input from the fault detection unit 600 indicative of a fault in the module, it starts to filter the messages so that only messages that are considered "safe" pass through. This is achieved by the filter monitoring the type of message and only allowing through types that are considered safe, blocking others. Depending on the bus protocol, each message will either be tagged with a tag indicating its type, or the type of message can be determined by reading the information contained in the message payload.

The provision of the filter 500 allows the module to continue to send some messages when there is a fault rather than being switched off completely. This allows some diagnostics of the module 500 to be performed when there is a fault, which may allow the vehicle to continue to operate in the event of the fault with a better performance than if the module was simply switched off. In addition, this will allow field-service personnel to access the diagnostic information to establish which particular unit is in a failure mode.

The filter 500 in this example is provided as part of an integrated circuit common to the processor, which may be located on a shared circuit board.

Figure 3:
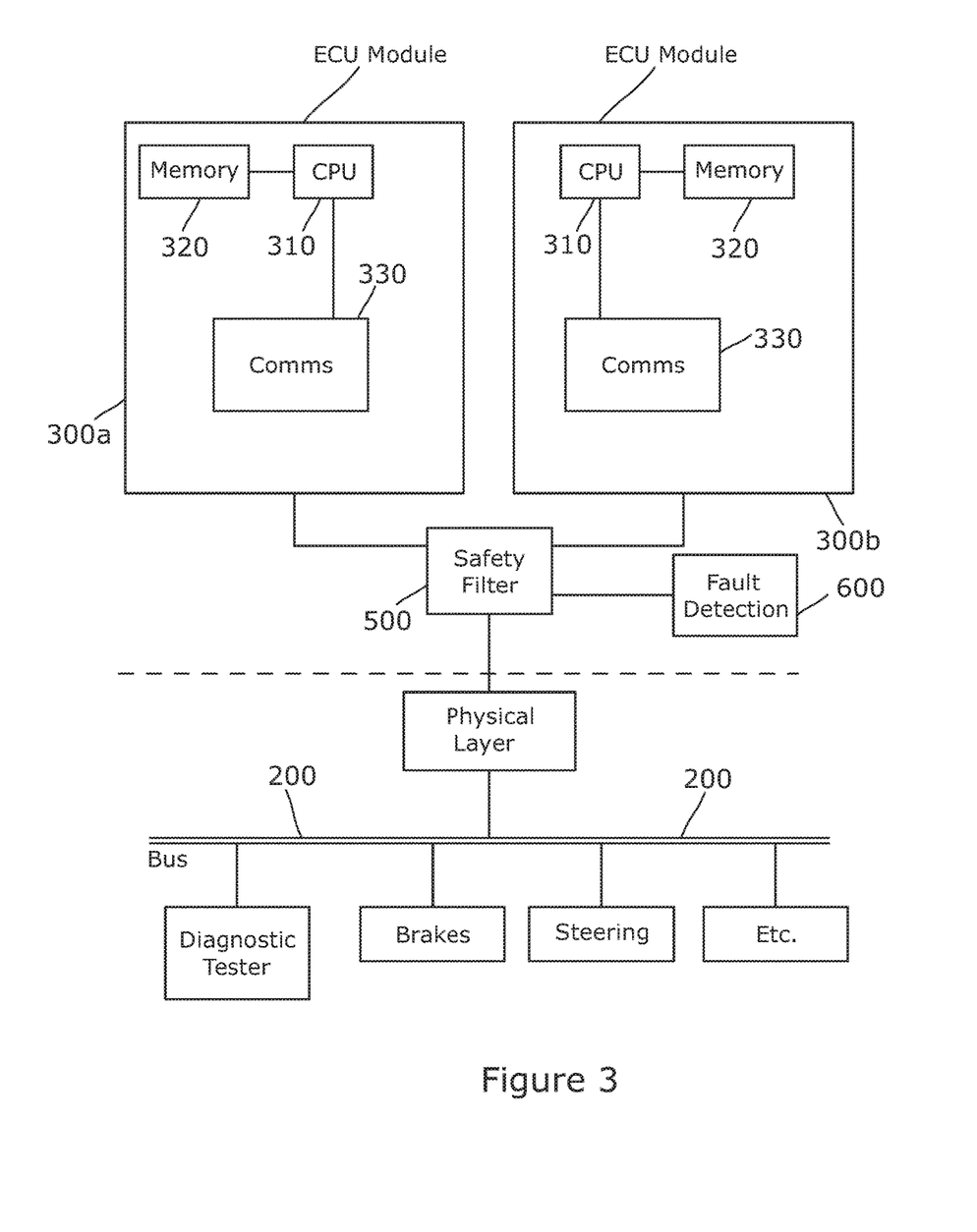
FIG. 3 is a schematic of an alternative electrical subsystem for the network of FIG. 1.

FIG. 3 shows an alternative electrical subsystem. This is the same as that shown in FIG. 2 but rather than each module 300 having a respective filter 500 there is one filter 500 shared between two modules 300a and 300b. This could be extended to three or more modules.

Figure 4:
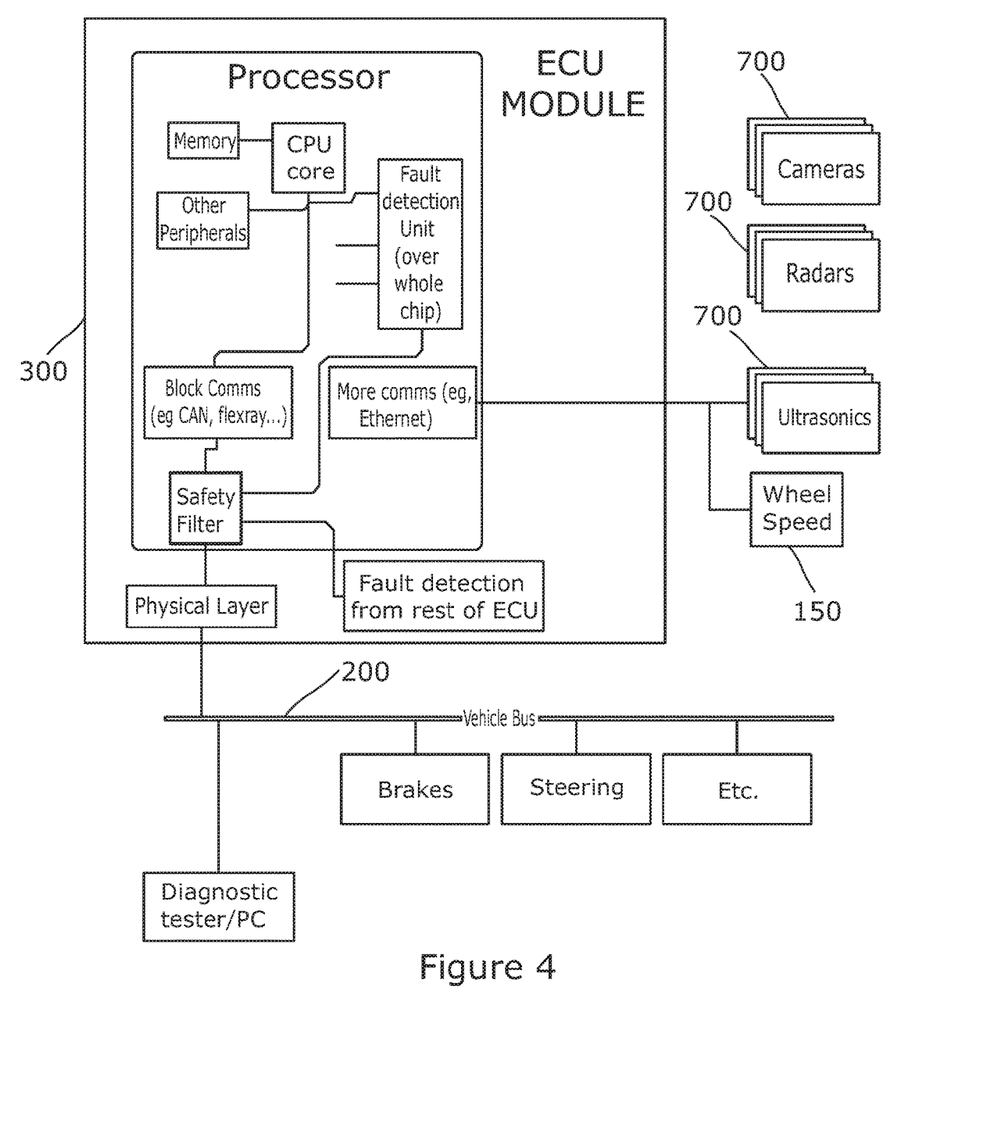
FIG. 4 is a still further schematic of another alternative electrical subsystem for the network of FIG. 1.

FIG. 4 shows a still further alternative in which the electronic control unit 310 of the module receives signals from multiple devices 700 such as radar, cameras or ultrasonic, or even wheel speed sensors 150. The information is received directly from those devices so that the devices themselves have no direct connection to the network bus 200 and may have no connection to any other module on the vehicle. In this case, safe signals may include the information received from the devices which may otherwise be completely inaccessible to other modules if the electronic control unit was switched off in the event of a fault.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. An electrical subsystem for a vehicle comprising an electronic control module adapted to generate one or more output messages suitable for transmission by a communication network, the subsystem further comprising:
   a message filter which is arranged in an event of a fault of the electronic control module to filter the messages generated by the electronic control module so that only messages that meet predefined criteria are transmitted by the communication network and to block messages that do not meet the predefined criteria, wherein the predefined criteria is that the message is non-safety-critical for the vehicle.

2. The electrical subsystem according to claim 1 in which the predefined criteria are stored in a memory associated with the filter in a form of a list or range of message types that are deemed safety critical, or a list or range of message types that are deemed not to be safety critical.

3. The electrical subsystem according to claim 1 in which the filter is arranged to receive an input signal from a diagnostic system, the input signal indicating whether the electronic control module is faulty or not faulty.

4. The electrical subsystem according to claim 1 in which the message filter is part of the electronic control module.

5. The electrical subsystem according to claim 4 wherein the message filter resides between a part of the control electronic control module that outputs messages and a network interface device that is arranged to pass the messages to the communication network.

6. The electrical subsystem according to claim 1 in which the electronic control module is adapted to receive input signals from one or more devices associated with the vehicle, and produce messages dependent upon a value of the input signals.

7. A message filter for use in a vehicle electrical subsystem that includes an electronic control module that is configured to generate messages of a number of different types that are to be transmitted across a network communication bus of the vehicle, in which the message filter comprises:

an input for receiving messages from the module prior to the messages being fed to the bus and an output at which the received messages can be fed onto the bus, the filter being configured so that in the event of a fault in the electronic control module the filter only passes through a subset of a total number of types of message from the module to the bus which meet a predefined criteria whilst allowing all messages to pass to the bus when there is no fault, wherein the predefined criteria is that the message is non-safety-critical for the vehicle.

8. The message filter according to claim 7 which is arranged to receive a signal from a fault detection unit indicative of whether the module has a fault.

9. The message filter according to claim 7 which includes a memory which stores the information indicating which types of message are safe to pass when there is a fault and which types are not safe to pass to the bus.

10. A method of operating an electrical subsystem of a vehicle comprising a communication network for carrying messages around the vehicle and at least one electronic control module which generates a number of different types of message for transmission by the network, the method comprising:

in an event that the electronic control module is faulty, filtering the messages so that only a subset of a total number of types of message which meet a predefined criteria are transmitted across the network, wherein the predefined criteria is that the message is non-safety-critical for the vehicle.

11. The method according to claim 10 which comprises determining whether the type of message meet the predefined criteria using information stored in a memory.

12. The method according to claim 10 which further comprises interrogating the faulty module to determine a nature of the fault and monitoring messages relevant to the interrogation that are allowed to pass by the filter.

* * * * *